United States Patent [19]

Johnson

[11] 4,029,429

[45] June 14, 1977

[54] BALL DRIVE NON-REVERSING TAPPING ATTACHMENT

[76] Inventor: Allan S. Johnson, 1400 Nottingham Road, Newport Beach, Calif. 92660

[22] Filed: May 24, 1976

[21] Appl. No.: 689,208

Related U.S. Application Data

[63] Continuation-in-part of Ser. Nos. 599,783, July 28, 1975, and Ser. No. 625,879, Oct. 28, 1975.

[52] U.S. Cl. .............................. 408/142; 408/139; 192/21; 192/67 R
[51] Int. Cl.² ..................... B23B 47/24; B23Q 1/46
[58] Field of Search .......... 408/139, 141, 142, 134; 192/67 R, 56 R, 21

[56] References Cited
UNITED STATES PATENTS

| | | | |
|---|---|---|---|
| 1,254,933 | 1/1918 | Peuch et al. | 408/142 |
| 2,684,491 | 7/1954 | Roddick | 408/139 |
| 3,179,965 | 4/1965 | Khachigan | 408/142 |

FOREIGN PATENTS OR APPLICATIONS

| | | | |
|---|---|---|---|
| 2,328,464 | 6/1973 | Germany | 408/139 |
| 1,431,172 | 4/1976 | United Kingdom | 408/142 |

*Primary Examiner*—Leonidas Vlachos

[57] ABSTRACT

The invention is an improved coupling or clutching means for driving between axially aligned rotating parts and is particularly adaptable in non-reversing tapping attachments. The attachment can, however, be driven in the reverse direction. Clutch drive means are provided for driving in either rotational direction. The clutch drive means is in the form of a sleeve having a ball race carrying driving balls interposed between axial splines on one part and axial grooves on the other part. The splines have an intermediate interruption for de-clutching after relative axial movement of the rotating parts. After further relative axial movement the balls re-engage the splines beyond the interruption, and the attachment is then driven in the reverse direction.

6 Claims, 5 Drawing Figures

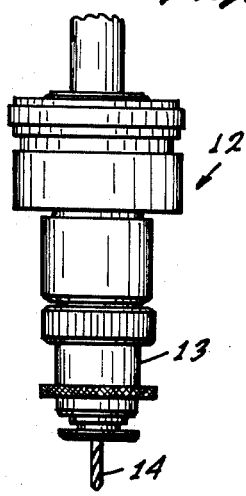
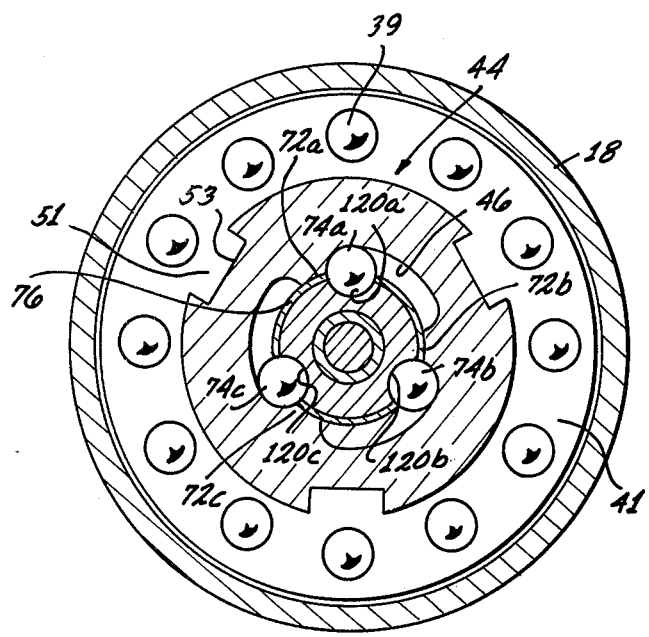
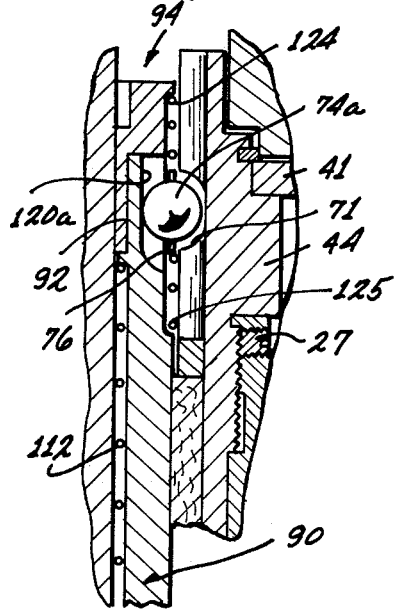
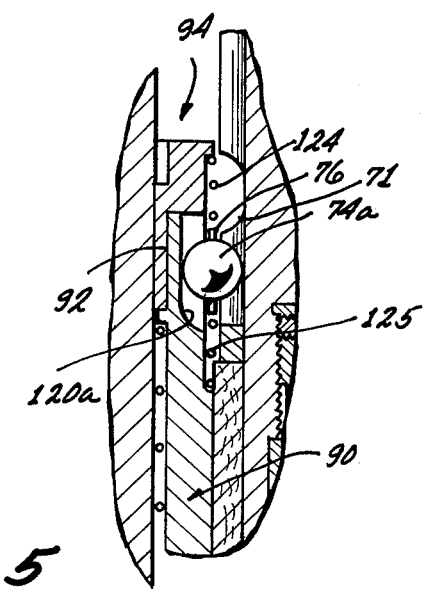

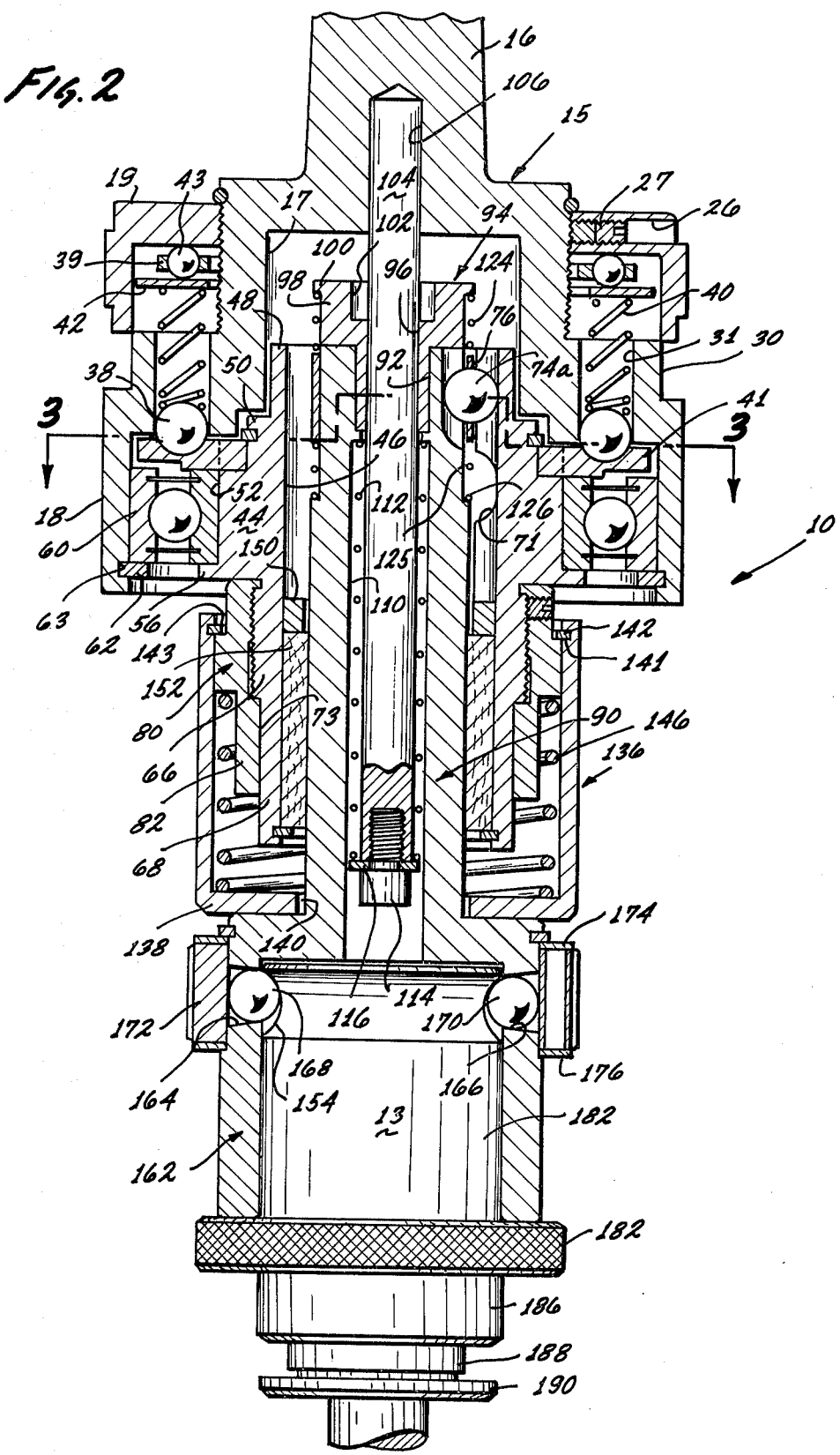

BALL DRIVE NON-REVERSING TAPPING ATTACHMENT

This application is a continuation-in-part of Ser. No. 599,783 filed on July 28, 1975, and of application Ser. No. 625,879 filed Oct. 28, 1975.

BACKGROUND OF THE INVENTION

1. Field of the Invention

The field of the invention is that of clutching means for providing drive between axially aligned members and is particularly adapted for tapping attachments. The exemplary form of the invention is embodied in a non-reversing tapping attachment of the type having free axial float. The drive is through ball members engageable with splines of special configuration to accommodate the purposes described hereinafter.

2. Description of the Prior Art

The background of the invention with respect to tapping attachements is examplified in prior patents of the is invention U.S. Pat. Nos. 3,002,206; 3,041,893; 3,397,588; 3,717,392; 3,791,756 and 3,946,844, which are hereby incorporated herein by reference. Reference is also made to U.S. Pat. No. 2,325,184. The background patents disclose the characteristics of tapping attachments having free axial float, and including both reversing and non-reversing types of attachments.

U.S. Pat. No. 3,002,206 shows a type of spindle suspension similar to that disclosed herein. U.S. Pat. No. 3,397,588 discloses a type of construction wherein for the direct drive there is provided a spring biased clutch driver member which functions to eliminate or minimize any chattering, when the clutch engages or disengages for direct drive. A similar clutch driver member may be and has been embodied in attachments having reverse drive as in U.S. Pat. No. 3,717,892. The herein invention improves particularly on the clutch driver means and its cooperation with the drive means and the spindle in a non-reversing type of attachment.

SUMMARY OF THE INVENTION

The improvements of the herein invention relate to coupling means or clutching means between rotating parts and particularly to the drive of the floating spindle in a tapping attachment. In an exemplary embodiment a clutch driver means provides drive through balls carried by a spring biased sleeve (clutch driver member). The balls engage between axial splines on a clutch driving member and grooves on the tapping spindle. The clutch driving member in the peferred embodiment is a single sleeve or ball retainer, resiliently carried by the spindly, the balls providing for driving engagement between splines on the clutch driver member and grooves on the spindle. The splines are interrupted. The attachment is a non-reversing type; (i.e.) the attachment itself does not embody reversing mechanism. When the balls reach the interruptions after relative axial movement, drive terminates. The attachment can then be moved relative to the spindle to cause the balls to engage the splines on the opposite side of the interruptions, and the attachment then being driven in reverse direction.

As may be observed, the invention basically is an improved coupling or clutching arrangement which facilitates clutching engagement between a driving and a driven member when driving in either one direction or the other. The realization of this is a primary object of the invention.

The specific nature of the improvements is described in detail hereinafter in connection with a preferred exemplary form of the invention.

In the light of the foregoing, further specific objects of the invention are as follows:

A further object is to achieve or realize the specific improvements, residing in a ball carrier having ball driving members interposed between rotating parts carried by one of the parts and cooperating with splines on one of the parts, the splines having an interruption to provide for decoupling or declutching with drive occurring with the balls on either one side or the other of the interruptions.

Further objects and additional advantages of the invention will become apparent from the following detailed description and annexed drawings wherein:

BRIEF DESCRIPTION OF THE DRAWINGS

FIG. 1 is a view of a preferred form of a tapping attachment embodying the invention;

FIG. 2 is a cross-sectional view of the tapping attachment of FIG. 1;

FIG. 3 is a sectional view taken along the line 3—3 of FIG. 2;

FIG. 4 is a partial sectional view illustrating de-coupling of parts;

FIG. 5 is a partial view similar to FIG. 4 showing the parts recoupled for drive in the opposite direction.

DESCRIPTION OF THE PREFERRED EMBODIMENT

Referring now more in detail to the various figures of the drawing, the tapping attachment is designated generally at 12. Numeral 13 designates the tool holder and the tap itself is designated at 14.

FIG. 2 shows the attachment 12 in cross-section. The attachment has a cylindrical body 15 having an upwardly extending part 16. The intermediate part is cylindrical and has a bore 17 as shown and skirt part 18. Numeral 19 designates a knurled adjusting cap. The cap 19 is externally knurled as described and threads onto the part 15. The cap 19 has a radial bore 26 which is threaded to receive the lock set screw 27. The cap 19 cooperates with the clutch mechanism as will be described for adjusting the amount of torque that can be transmitted. Numeral 21 designates a snap ring in an annular groove adjacent cap 19.

The intermediate part of the body 15 has angularly spaced axial bores as shown at 31. In these bores are coil springs as designated at 40. One end of these springs seats on balls 38 fitting in recesses in the clutch palte 41 and the other ends seat on the spring plate 42 in the cap 19. A thrust bearing is interposed between spring plate 42 and the inside surface of the top of cap 19. This thrust bearing comprises ball ring 39 having openings with balls 43 in them.

Numeral 44 designates the clutch drive sleeve. It is generally cylindrical as shown having an inside bore 46. At this upper end 48, it is of a diameter to fit within the bore 17 of the part 15. It has a portion 50 of a larger diameter providing a square shoulder between it and the part 48. It has a part 52 of still larger diameter with a square shoulder between this part and the part 50. Clutch plate 41 fits onto the part having the diameter 50. Clutch plate 41 has extending tabs 51 that fit in cut-outs 53 in sleeve 44 for driving. See FIG. 3. Numeral 54 designates a snap ring in an annular groove holding clutch plate 41.

The clutch drive sleeve 44 has an extending flange 56 and between this flange and the clutch drive plate 41 is a ball bearing 60. Numeral 62 designates a snap ring seated in groove 63.

Below the portion 52 of the clutch drive sleeve 44 it has a portion 66 which is externally threaded and below this is another portion 68 slightly smaller in diameter.

Formed on the inside of the bore 46 of the clutch drive sleeve 44 are axial splines as designated at 72a, 72b, and 72c, as may be seen in FIG. 3. The splines have arcuate side surfaces of a radius corresponding to the drive balls as designated at 74a, 74b, and 74c. The drive balls are carried in a circular carrier 76, which carrier is carried on the spindle as will be described presently. Each spline has an intermediate interruption as designated at 71 in FIG. 2.

Numeral 80 designates a bushing that is threaded onto the part 66 of the clutch drive sleeve. It has a lower portion 82 having a bore 73, the lower part 68 of the clutch drive sleeve 44 fitting into this bore.

Numeral 90 designates the driven spindle which is cylindrical having an end bore 92. Fitting within it upper end is a bushing 94 having a bore 96 and having an upper end part 98 of larger diameter which fits against the end of spindle 90 and which has a spring retaining flange 100. It has a counterbore 102. Numeral 104 designates a suspension rod or stem extending from bore 106 in part 15 and which extends through bore 96 in bushing 94.

Spindle 90 has a main bore 110. Stem 104 extends into this bore. In the bore around stem 104 is coil spring 112 which is retained by screw 114 and washer 116 on the end of stem 104. The spring normally urges the spindle upwardly.

The upper end of spindle 90 has three axial grooves or ways 120a, 120b, and 120c engageable with balls 74a, 74b, and 74c, the grooves having radii correspondong to the balls.

Numeral 76 designates the ball carrier member or sleeve which is for driving in either direct or reverse direction.

The member 76 is a sleeve carried on spindle 18. It is cylindrical and is biased by springs 124 and 125 bearing respectively against flange 100 and a shoulder 126 on spindle 90 (see FIG. 2). The angularly spaced splines 72a, 72b, and 72c have arcuate sides to conform to the radius of driving balls. They are angularly spaced an may be seen in FIG. 3. Sleeve 76 forms a ball race or retainer and formed in it are equally angularly spaced ball receiving openings. Received in the openings are driving balls 74a, 74b, and 74c. The balls engage the splines 72a, 72b, and 72c on clutch sleeve 76. The splines have arcuate axial sides of radius conforming to that of the balls. Balls 74a, 74b, and 74c move axially in grooves 120a, 120b, and 120c in spindle 90. See FIG. 3.

Numeral 136 designates a bushing having a bottom part 138 with a bore or opening 140 in it. The bushing fits onto the bushing 80 and inside its upper end is an annular groove 141 having in it a snap ring 142 that engages on shoulder 143 on the bushing 80. Numeral 146 designates a coil spring within the bushing 136, the coil spring being around the bushing 80, its upper end engaging the shoulder between the parts of bushing 80 and its lower end engaging the bottom 138 of bushing 136. The bushing 136 can be moved axially against the spring 146.

Bushing 80 provides a depth control adjstment as in U.S. Pat. No. 3,946,844. Bushing 136 and spring 146 provide cushioning means operative in the event the top should reach bottom when the attachment is still advancing.

Numeral 150 represents a ring within the bore 46 and also numeral 152 designates a bushing within the bore 46 and journalling the spindle 90.

At the lower end of the spindle 90 is a cylindrical receptacle designated by a numeral 162. In the side walls of the receptacle are radial openings as designated by the numerals 164 and 166 which have an outward taper as shown and which retain balls as designated at 168 and 170. The balls engage in the annular groove 154, of the tap holder 13. Numeral 172 designates an adjusting ring around the receptacle 162 which normally retains the balls 168 and 170 in position. The ring is adjustable to a position to release the balls to let them move outwardly radially so as to release from the groove 154 in the tap holder 13 so that it can be taken out axially. The ring 172 is between guide rings 174 and 176 and it is retained by a snap ring 178 in a groove in the receptacle 162. The tool holding receptacle 162 may be like that in application Ser. No. 575,359, filed May 7, 1975 and owned by a common assignee, which is incorporated herein by reference.

The tap holder 13 is carried at the lower end of spindle 90 in receptacle 162. It has a cylindrical body part 182 and an annular groove 154 at the upper part which is arcuate in cross section. Numeral 181 designates a knurled adjusting ring. The tool holder has parts of different diameter at its lower end as designated at 186, 188, and 190.

OPERATION

The operation of the attachment as described is illustrated in FIGS. 4 and 5. The attachment as shown is a non-reversing attachment. In normal operation the attachment is being advanced axially while the spindle and bit are being rotated. When axial advancement of the attachment stops, rotation of the spindle continues and the spindle moves downwardly axially relatively until the balls 74a, 74b, and 74c reach the interruptions 71 in the splines 72a, 72b, and 72c. The balls release quickly and readily as described in the prior applications referred to. The attachment may then be retracted, that is moved upwardly axially while the spindle remains in the same position. This brings the balls 74a, 74b, and 74c into engagement with the portion of the splines 72a, 72b, and 72c below the interruptions 71. FIGS. 4 and 5 illustrate positions of the drive balls relative to the interruptions in the splines.

The parts are now in position for the attachment to be driven in the reverse direction and the reverse drive is now transmitted through the same drive balls to the spindle.

From the foregoing those skilled in the art will readily understand the nature and operation of the invention and its utility by virtue of having the interruptions in the splines as described. The coupling or clutching balls carried in the spring biased carrier are adapted for driving the spindle in one direction. and then after the appropriate relative movements of the attachment relative to the spindle, the balls engage the splines below the interruptions for driving in the opposite direction.

The foregoing disclosure is representative of the preferred form of the invention and is to be interpreted in an illustrative rather than limiting sense the invention to be accorded the full scope of the claims appended hereto.

I claim:

1. In coupling means for transmitting torque, in combination, a first rotating member, a second axially aligned member, said members being relatively movable axially, means for transmitting rotary drive from one member to the other, said means including at least one ball member positioned between the rotating members, both the rotating members having axial configurations engageable with the ball member whereby drive is transmitted through the ball member, the axial configurations on one of the rotating members being axial splines, said splines having an interruption therein, whereby after relative axial movement between the rotating members the ball member reaches the interruptions, the transmission of rotation is terminated, the rotating members being relatively movable axially into a position wherein the said ball member passes the interruptions and transmission of rotary drive is resumed.

2. Coupling means as in claim 1, including a circular ball carrier carrying the ball member, means biasing the ball carrier, whereby the ball releases quickly when it reaches the interruptions.

3. Coupling means as in claim 1, wherein the first rotating member is part of a tapping attachment adapted for rotation and to be moved axially, the second rotating member being the tapping spindle of the tapping attachment.

4. A combination as in claim 3, wherein the tapping attachment includes a drive collar member, the drive collar member having the axial splines thereon.

5. A combination as in claim 4, including a circular ball carrier carrying said ball member, and biasing means biasing the ball carrier member in a manner whereby the ball quickly releases when it reaches the interruptions.

6. A combination as in claim 3, wherein the said spindle is advanced axially relative to the attachment until the said ball member reaches the interruptions thereby releasing from the splines, the attachment being movable axially relative to the spindle to bring the ball into engagement with the splines beyond the interruptions, and the attachment being reversible whereby to transmit rotary motion to the spindle in the reverse direction.

* * * * *